(12) United States Patent
Shih et al.

(10) Patent No.: US 7,101,051 B2
(45) Date of Patent: Sep. 5, 2006

(54) PROJECTOR FOR PORTABLE ELECTRONIC APPARATUS

(75) Inventors: Wei-Chung Shih, Taoyuan (TW); Ying-Fang Lin, Yunlin (TW)

(73) Assignee: BENQ Corporation, Taoyuan (TW)

( * ) Notice: Subject to any disclaimer, the term of this patent is extended or adjusted under 35 U.S.C. 154(b) by 0 days.

(21) Appl. No.: 10/809,534

(22) Filed: Mar. 25, 2004

(65) Prior Publication Data
US 2004/0201879 A1 Oct. 14, 2004

(30) Foreign Application Priority Data
Apr. 10, 2003 (TW) .............................. 92108217 A

(51) Int. Cl.
*G03B 21/28* (2006.01)
*G02F 1/00* (2006.01)

(52) U.S. Cl. .............................. 353/99; 353/94; 353/85; 348/771

(58) Field of Classification Search ................. 353/94, 353/98, 99, 33, 122, 85; 348/755–757, 771
See application file for complete search history.

(56) References Cited

U.S. PATENT DOCUMENTS

| 5,689,321 | A * | 11/1997 | Kochi ......................... 349/143 |
| 5,784,129 | A * | 7/1998 | Konuma et al. ............. 348/739 |
| 6,020,937 | A * | 2/2000 | Bardmesser ................. 348/756 |
| 6,154,259 | A * | 11/2000 | Hargis et al. ................ 348/756 |
| 6,406,148 | B1 * | 6/2002 | Marshall et al. .............. 353/31 |
| 6,603,588 | B1 * | 8/2003 | Hagelin et al. ............. 359/212 |
| 6,636,339 | B1 * | 10/2003 | Lee ............................. 359/202 |
| 6,779,893 | B1 * | 8/2004 | O'Connor et al. ............ 353/20 |
| 6,863,401 | B1 * | 3/2005 | Penn ............................ 353/31 |
| 6,882,356 | B1 * | 4/2005 | Roddy et al. ............... 347/224 |
| 6,900,922 | B1 * | 5/2005 | Aubuchon ................... 359/292 |
| 6,906,852 | B1 * | 6/2005 | Russell ....................... 359/298 |
| 2004/0012863 | A1 * | 1/2004 | Tzidon et al. .............. 359/843 |
| 2004/0169910 | A1 * | 9/2004 | Mehrl ......................... 359/290 |
| 2005/0062944 | A1 * | 3/2005 | Slobodin ..................... 353/94 |

* cited by examiner

*Primary Examiner*—W. B. Perkey
*Assistant Examiner*—Andrew Sever
(74) *Attorney, Agent, or Firm*—Quintero Law Office

(57) ABSTRACT

A projector. The projector comprises a projection light source, a first digital micro-mirror device, and a second digital micro-mirror device. The projection light source emits a projection beam toward the first digital micro-mirror device. The first digital micro-mirror device reflects the projection beam to the second digital micro-mirror device. A first micro-mirror on the first digital micro-mirror device is rotated in a horizontal direction to adjust the horizontal position of the projection beam. The second digital micro-mirror device reflects the projection beam from the first digital micro-mirror device to a projection plate. Second micro-mirrors on the second digital micro-mirror device are rotated in a vertical direction to adjust the vertical position of the projection beam.

21 Claims, 4 Drawing Sheets

PROJECTOR FOR PORTABLE ELECTRONIC APPARATUS

BACKGROUND OF THE INVENTION

1. Field of the Invention

The present invention relates to a projector, and in particular to a projector disposed in a portable electronic apparatus.

2. Description of the Related Art

MEMS technology is applied in many common apparatus or electronic products. The DMD (Digital Micro-mirror Device) produced by TEXAS INSTRUMENTS is a reflection device used in projection apparatus. The technology applied in DMD is DLP (Digital Light Processing). The DMD comprises many micro-mirrors, arrayed in a grid, each reflecting a light beam to form a pixel on a projection plate. The DLP has a three-color light source (red, green, and blue) which emits three colored light beams. The color light beams contact the micro-mirrors alternatingly, controlling the number of light beams reflected to the projection plate to represent the brightness and color of pixels, composing a complete full-color image.

Conventionally, the DMD is used in overhead projectors. However, since the DMD is a small device, it can be applied to a portable electronic apparatus like mobile phones or PDA, providing a small, convenient portable projector.

However, even though pixels may be dark, the projection light source emits the same quantity of light for each, despite the micro-mirror not reflecting the light to the projection plate. Thus, energy is wasted. Projectors utilizing DMD technology, if applied in a portable electronic apparatus, use excessive energy, creating a serious problem.

SUMMARY OF THE INVENTION

For this reason, there is a need for an energy-saving projector for portable electronic apparatus.

The projector according to the invention comprises a projection light source, a first digital micro-mirror device, and a second digital micro-mirror device. The projection light source emits a projection beam toward the first digital micro-mirror device. The first digital micro-mirror device reflects the projection beam to the second digital micro-mirror device. A first micro-mirror on the first digital micro-mirror device is rotated in a horizontal direction to adjust the horizontal position of the projection beam. The second digital micro-mirror device reflects the projection beam from the first digital micro-mirror device to a projection plate. Second micro-mirrors on the second digital micro-mirror device are rotated in a vertical direction to adjust the vertical position of the projection beam.

The present invention uses less energy than the conventional design, and thus, can be applied to a portable electronic apparatus like mobile phone or PDA, enabling convenient, portable projection of images.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
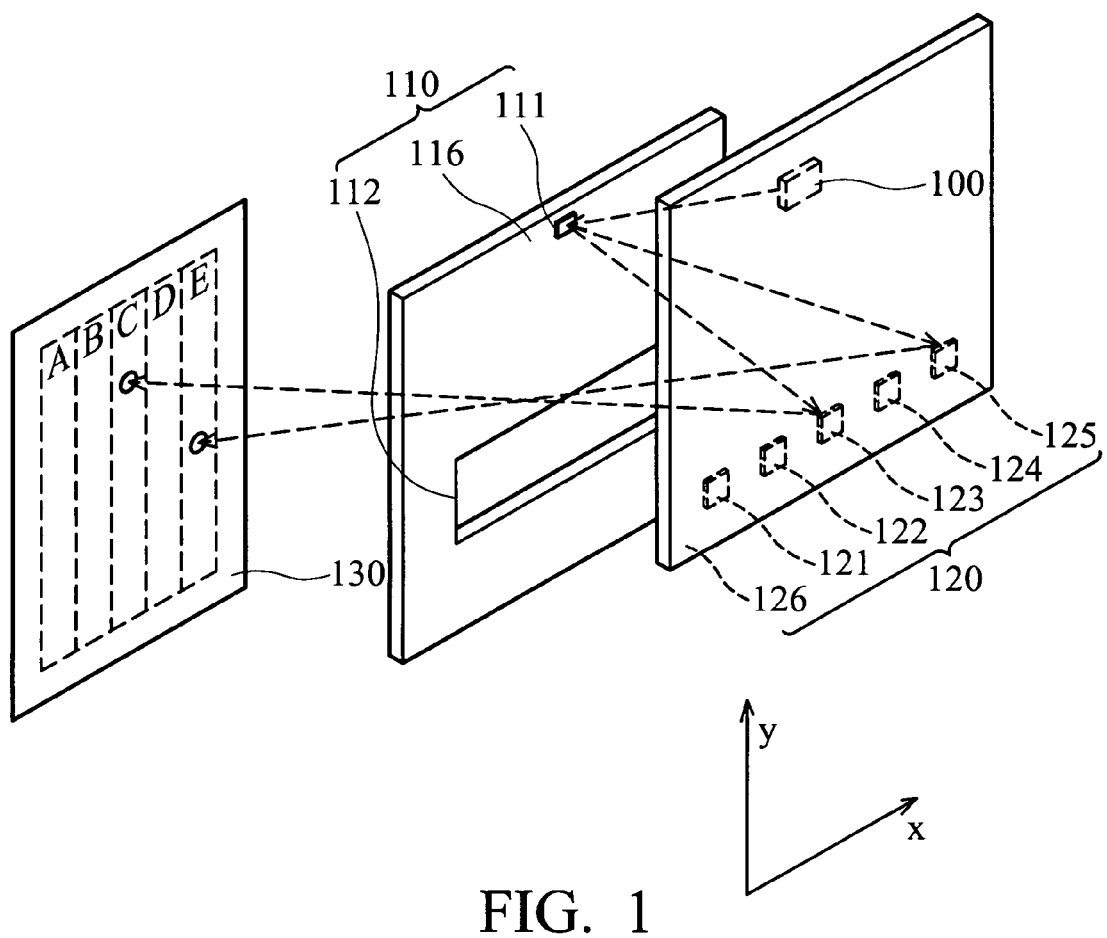
FIG. 1 is a schematic diagram of the present invention.

As shown in FIG. 1, the present invention comprises a projection light source 100, a first digital micro-mirror device 110, and a second digital micro-mirror device 120. The projection light source 100 emits a projection beam toward the first digital micro-mirror device 110. The first digital micro-mirror device 110 reflects the projection beam to the second digital micro-mirror device 120. A first micro-mirror 111 on the first digital micro-mirror device 110 is rotated in a horizontal direction (with respect to a y axis) to adjust the horizontal position of the projection beam. The second digital micro-mirror device 120 reflects the projection beam from the first digital micro-mirror device 110 to a projection plate 130. Second micro-mirrors 121~125 on the second digital micro-mirror device 120 are rotated in a vertical direction (with respect to an x axis) to adjust the vertical position of the projection beam.

The first digital micro-mirror device 110 comprises a first chip 116 and the first micro-mirror 111. The first micro-mirror 111 is disposed on the first chip 116.

The second digital micro-mirror device 120 comprises a second chip 126 and the second micro-mirrors 121~125. The second micro-mirrors 121~125 are disposed on the second chip 126.

The projection light source 100 can be a laser. The projection light source 100 and the second micro-mirrors 121~125 are disposed on the second chip 126. The first chip 116 has an opening 112. The projection beam can be projected to the projection plate 130 through the opening 112.

As the projection beam contacts the first micro-mirror 111, it is rotated to direct the projection beam to the second micro-mirrors 121~125. As shown in FIG. 1, when the first micro-mirror 111 directs the projection beam to the second micro-mirror 123, the second micro-mirror 123 reflects the projection beam to an area C on the projection plate 130. When the first micro-mirror 111 directs the projection beam to the second micro-mirror 121, the second micro-mirror 121 reflects the projection beam to an area A on the projection plate 130. Similarly, when the first micro-mirror 111 directs the projection beam to the second micro-mirror 122, the second micro-mirror 122 reflects the projection beam to an area B on the projection plate 130. When the first micro-mirror 111 directs the projection beam to the second micro-mirror 124, the second micro-mirror 124 reflects the projection beam to an area D on the projection plate 130. When the first micro-mirror 111 directs the projection beam to the second micro-mirror 125, the second micro-mirror 125 reflects the projection beam to an area E on the projection plate 130.

The second micro-mirrors 121~125 are rotated in a vertical direction (with respect to the x axis) to adjust the vertical position of the projection beam. Thus, by the rotation of the first micro-mirror 111 and the second micro-mirrors 121~125, the present invention can project the projection beam at any point on the projection plate 130. By the projection light source controlling the brightness and color of the projection beam, the projection beam produces a complete image after fast scanning of the entire projection plate. The first micro-mirror device, the second micro-mirror device and the projection light source can be packaged into a single IC device by IC package process.

Figure 2A:
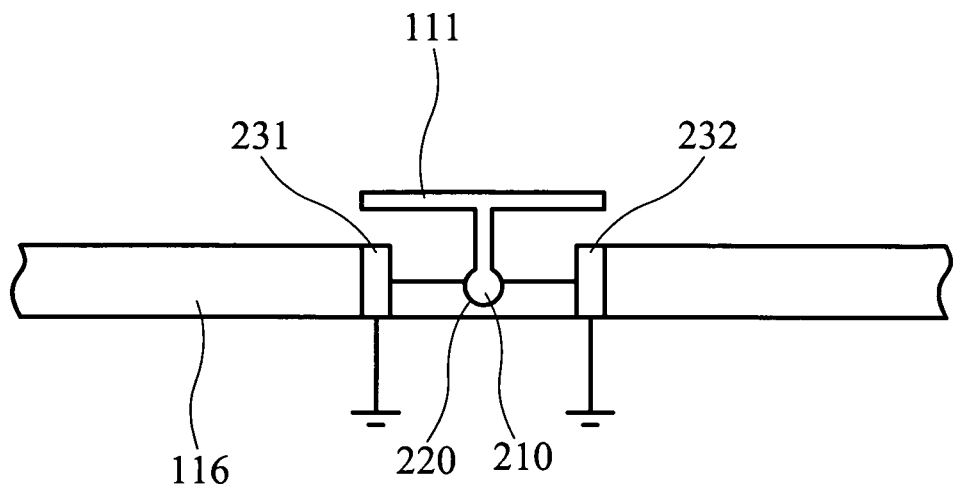
FIG. 2a is a schematic diagram of a micro-mirror of the present invention.

As shown in FIG. 2a, the first micro-mirror 111 is formed on the first chip 116. The first micro-mirror 111 has a pivot portion 210. The first chip 116 further has electrodes 231, 232 and pivot recess 220. The pivot portion 210 corresponds to the pivot recess 220. Applying electricity to the electrodes 231, 232 rotates the first micro-mirror 111. Thus, the path of the projection beam is controlled. The rotation range of the first micro-mirror 111 is 10°, comprising 5° toward the electrodes 231 or 232 respectively.

Figure 2B:
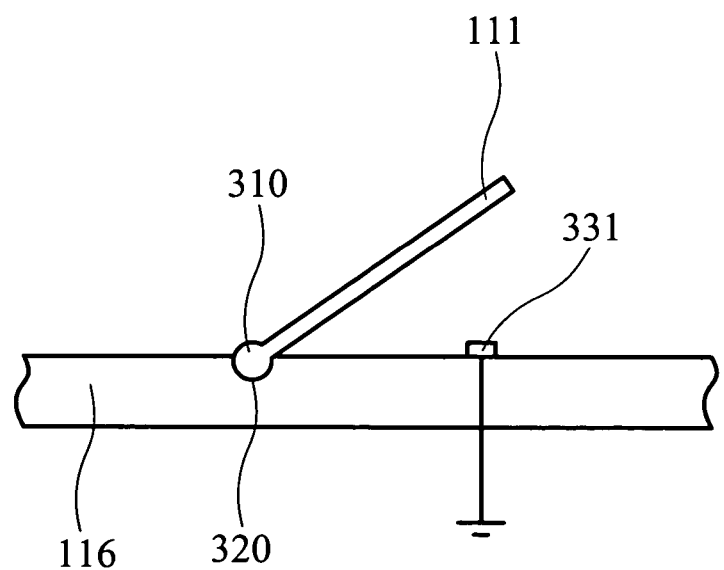
FIG. 2b is a schematic diagram of another micro-mirror of the present invention.

FIG. 2b shows another kind of example of the first micro-mirror 111. The first micro-mirror 111 is formed on the first chip 116. The first micro-mirror 111 has a pivot portion 310. The first chip 116 further has an electrode 331 and a pivot recess 320. The pivot portion 310 compares with the pivot recess 320. Applying electricity to the electrodes 331 rotates the first micro-mirror. Thus, the path of the projection beam is controlled. The rotation range of the first micro-mirror 111 is 10°, such that an included angle between the first micro-mirror 111 and the first chip 116 can be no more than 10°.

The first micro-mirror 111 and the second micro-mirrors 121~125 are the same in structure, such that integration in the structure disclosed is enabled.

Figure 3:
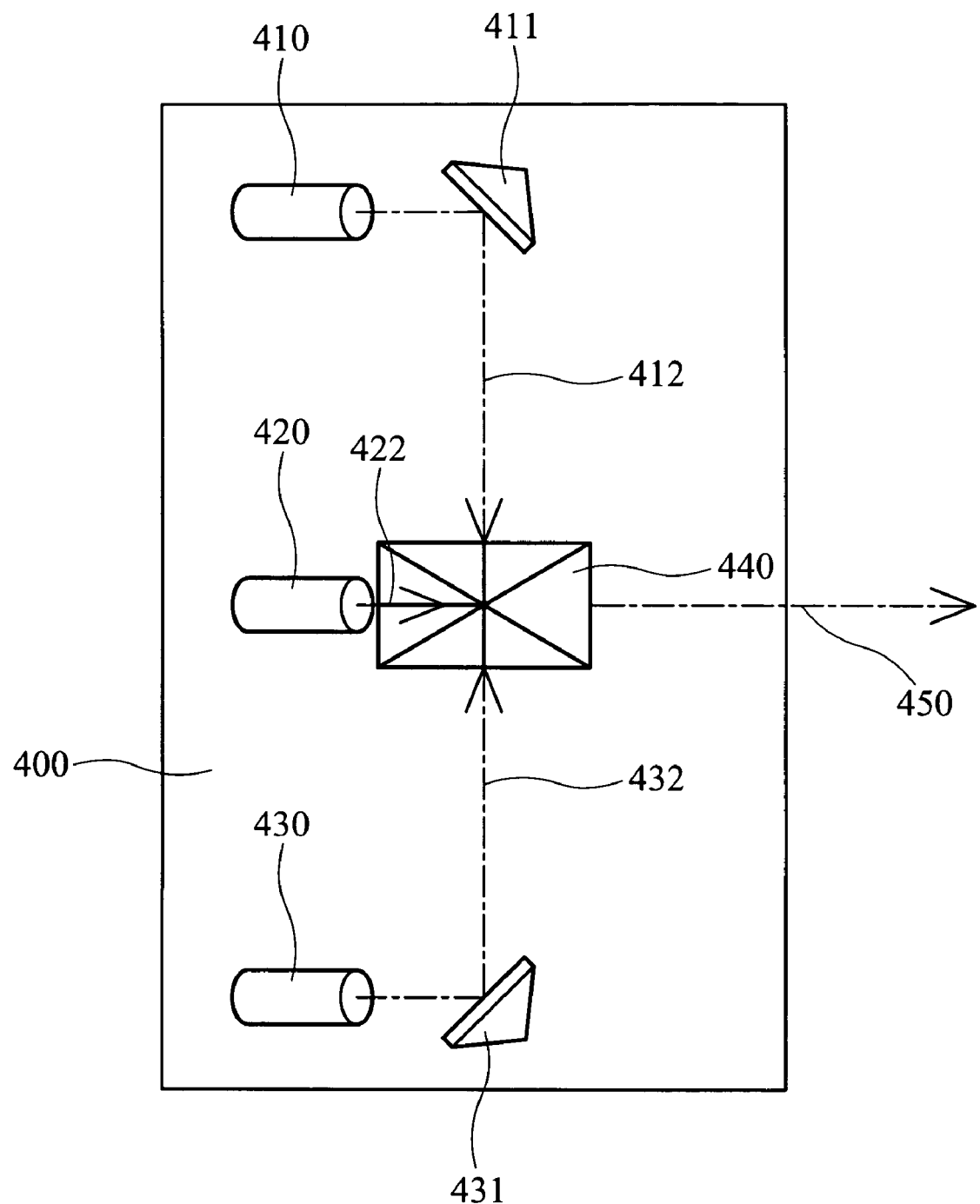
FIG. 3 is a schematic diagram of the projection light source.

As shown in FIG. 3, to illuminate a colored projection beam, the projection light source 100 comprises a first color light source (red light source) 430, a second color light source (green light source) 420, a third color light source (blue light source) 410 and a prism assembly 440. The first color light source 430 emits a first color beam (red beam) 432. The second color light source 420 emits a second color beam (green beam) 422. The third color light source 410 emits a third color beam (blue beam) 412. The blue beam 412 reaches the reflector 411 and is reflected to the prism assembly 440. The red beam 432 reaches the reflector 431 and is reflected to the prism assembly 440. The green beam 422 reaches the prism assembly directly. The prism assembly 440 combines the red beam 432, the green beam 422 and the blue beam 412 as the projection beam 450. The color and brightness of the projection beam 450 are adjusted by controlling the brightness of the red beam 432, the green beam 422 and the blue beam 412. The projection light source 100 (comprising the first color light source 420, the second color light source 410, the third color light source 410, the prism assembly 440 and reflectors 411,431) can be directly disposed on the second chip 126 or on a single device (a third digital micro-mirror device 400). The third digital micro-mirror device 400 can further be disposed on the second chip 126.

Figure 4:
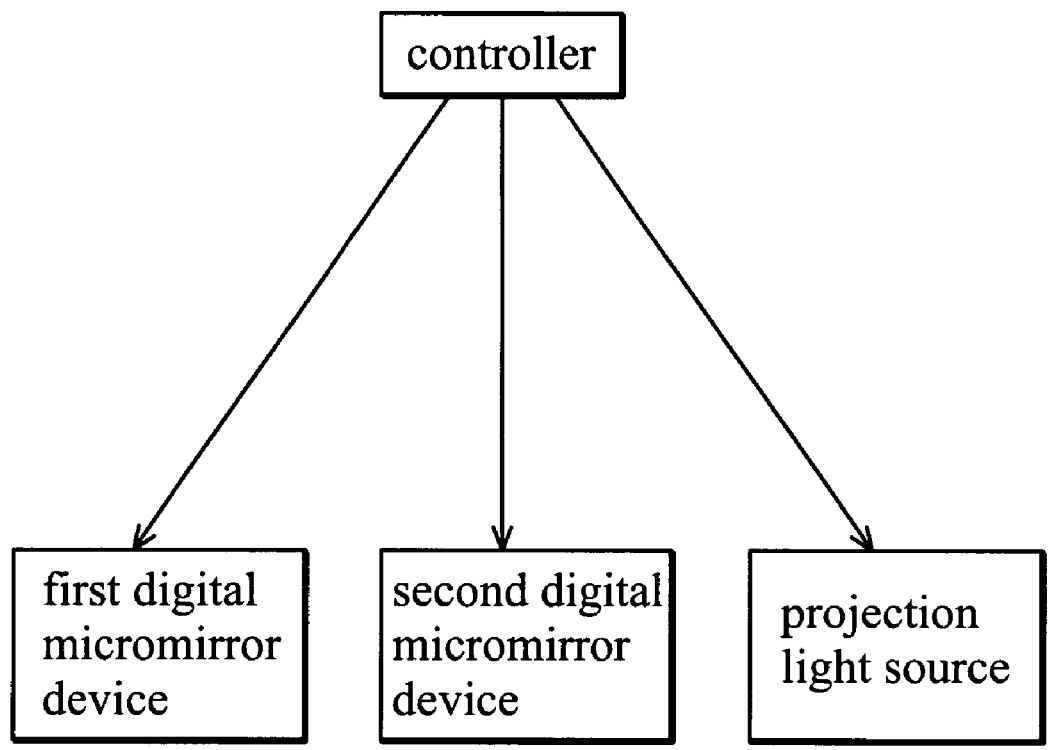
FIG. 4 is a block diagram of the present invention.

As shown in FIG. 4, the present invention can further comprise a controller. The controller connects with the projection light source 100, a first digital micro-mirror device 110 and a second digital micro-mirror device 120. The controller controls the switch of the projection light source 100 and the orientations of the first micro-mirror 111 and the second micro-mirrors 121~125.

The present invention efficiently uses only the light supplied by the projection light source. When the present invention displays a dark pixel, the projection light source is disabled rather than reflected away from the projection plate as in the conventional design. Thus, the inventive projection light source uses less than 0.5 w, considerably less power than the conventional design, such that the present invention can be applied to a portable electronic apparatus like mobile phone or PDA.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projector for projecting an image to a projection plate, comprising:
   a first digital micro-mirror device, with a first micro-mirror disposed thereon;
   a second digital micro-mirror device, comprising a plurality of second micro-mirrors disposed thereon; and
   a projection light source, emitting a projection beam toward the first digital micro-mirror device;
   wherein the first digital micro-mirror device reflects the projection beam from the projection light source to the second digital micro-mirror device, the first micro-mirror is rotatable with respect to a vertical axis to adjust a horizontal position where the projection beam is projected on the second digital micro-mirror device, the second digital micro-mirror device reflects the projection beam from the first digital micro-mirror device to the projection plate, and the second micro-mirrors are rotatable with respect to a horizontal axis to adjust a vertical position where the projection beam is projected on the projection plate,
   wherein the projection light source comprises a first color light source, a second color light source, a third color light source and a prism assembly, the first color light source emits a first color beam, the second color light source emits a second color beam, the third color light source emits a third color beam, and the prism assembly combines the first, second, and third color beam into the projection beam,
   wherein the first color light source, the second color light source, and the third color light source are disposed on the second digital micro-mirror device.

2. The projector as claimed in claim 1, wherein the first digital micro-mirror device further comprises a first chip, with the first micro-mirror disposed thereon.

3. The projector as claimed in claim 1, wherein the rotation range of the first micro-mirror is 10°.

4. The projector as claimed in claim 1, wherein the second digital micro-mirror device further comprises a second chip, with the second micro-mirrors disposed thereon.

5. The projector as claimed in claim 4, wherein the second micro-mirrors are arranged on the second chip along a horizontal axis.

6. The projector as claimed in claim 1, wherein the rotation range of the second micro-mirror is 10°.

7. The projector as claimed in claim 1, wherein the projection light source is a laser.

8. The projector as claimed in claim 7, wherein the power of the laser is less than 0.5 w.

9. The projector as claimed in claim 1, wherein the prism assembly is disposed on the second digital micro-mirror device.

10. The projector as claimed in claim 1, wherein the projection light source further comprises a first reflector and a second reflector, with the first reflector directing the first color beam to the prism assembly.

11. The projector as claimed in claim 1, wherein the first color beam is a red beam, the second color beam is a green beam, and the third color beam is a blue beam.

12. The projector as claimed in claim 1, further comprising a controller, connecting with the projection light source, the first digital micro-mirror device and the second digital micro-mirror device to control the switch of the projection light source and orientations of the first digital micro-mirror device and the second digital micro-mirror device.

13. The projector as claimed in claim 12, wherein the controller controls the orientations of the first and second digital micro-mirror devices to illuminate a plurality of discrete points on the projection plate with the projection beam to produce a complete image after fast scanning the projection plate.

14. The projector as claimed in claim 13, wherein the controller disables the projection light source for dark pixels in the complete image.

15. The projector as claimed in claim 1, wherein the projection light source is disposed on the second digital micro-mirror device.

16. The projector as claimed in claim 1, wherein the first micro-mirror device, the second micro-mirror device and the projection light source are packaged into a single IC device by IC package process.

17. The projector as claimed in claim 1, wherein the first digital micro-mirror device further comprises an opening, through which the projection beam reflected from the second digital micro-mirror device is projected on the projection plate.

18. The projector as claimed in claim 1, wherein the projector is applied in a portable electronic apparatus.

19. A projector for projecting an image to a projection plate, comprising:
  a first digital micro-mirror device, with a first micro-mirror disposed thereon;
  a second digital micro-mirror device, comprising a plurality of second micro-mirrors disposed thereon; and
  a projection light source, emitting a projection beam toward the first digital micro-mirror device;
  wherein the first digital micro-mirror device reflects the projection beam from the projection light source to the second digital micro-mirror device, the first micro-mirror is rotatable with respect to a vertical axis to adjust a horizontal position where the projection beam is projected on the second digital micro-mirror device, the second digital micro-mirror device reflects the projection beam from the first digital micro-mirror device to the projection plate, and the second micro-mirrors are rotatable with respect to a horizontal axis to adjust a vertical position where the projection beam is projected on the projection plate,
  wherein the projection light source is disposed on the second digital micro-mirror device.

20. A projector for projecting an image to a projection plate, comprising:
  a first digital micro-mirror device, with a first micro-mirror disposed thereon;
  a second digital micro-mirror device, comprising a plurality of second micro-mirrors disposed thereon; and
  a projection light source, emitting a projection beam toward the first digital micro-mirror device;
  wherein the first digital micro-mirror device reflects the projection beam from the projection light source to the second digital micro-mirror device, the first micro-mirror is rotatable with respect to a vertical axis to adjust a horizontal position where the projection beam is projected on the second digital micro-mirror device, the second digital micro-mirror device reflects the projection beam from the first digital micro-mirror device to the projection plate, and the second micro-mirrors are rotatable with respect to a horizontal axis to adjust a vertical position where the projection beam is projected on the projection plate,
  wherein the first micro-mirror device, the second micro-mirror device and the projection light source are packaged into a single IC device by IC package process.

21. A projector for projecting an image to a projection plate, comprising:
  a first digital micro-mirror device, with a first micro-mirror disposed thereon;
  a second digital micro-mirror device, comprising a plurality of second micro-mirrors disposed thereon; and
  a projection light source, emitting a projection beam toward the first digital micro-mirror device;
  wherein the first digital micro-mirror device reflects the projection beam from the projection light source to the second digital micro-mirror device, the first micro-mirror is rotatable with respect to a vertical axis to adjust a horizontal position where the projection beam is projected on the second digital micro-mirror device, the second digital micro-mirror device reflects the projection beam from the first digital micro-mirror device to the projection plate, and the second micro-mirrors are rotatable with respect to a horizontal axis to adjust a vertical position where the projection beam is projected on the projection plate,
  wherein the first digital micro-mirror device further comprises an opening, through which the projection beam reflected from the second digital micro-mirror device is projected on the projection plate.

* * * * *